Figure 1:
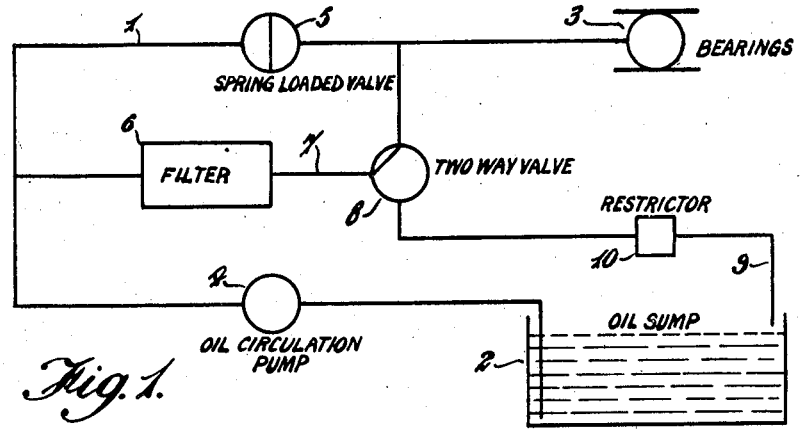

June 21, 1949. E. R. ROBERTSON 2,473,727
OIL FILTERING APPARATUS
Filed Feb. 18, 1944 5 Sheets-Sheet 1

INVENTOR
Edward R. Robertson
By Watson, Cole, Grindle & Watson
ATTORNEYS

June 21, 1949.  E. R. ROBERTSON  2,473,727
OIL FILTERING APPARATUS

Filed Feb. 18, 1944  5 Sheets-Sheet 2

INVENTOR
Edward R. Robertson
BY Watson, Cole, Grindle & Watson
ATTORNEYS

June 21, 1949.  E. R. ROBERTSON  2,473,727
OIL FILTERING APPARATUS
Filed Feb. 18, 1944   5 Sheets-Sheet 3
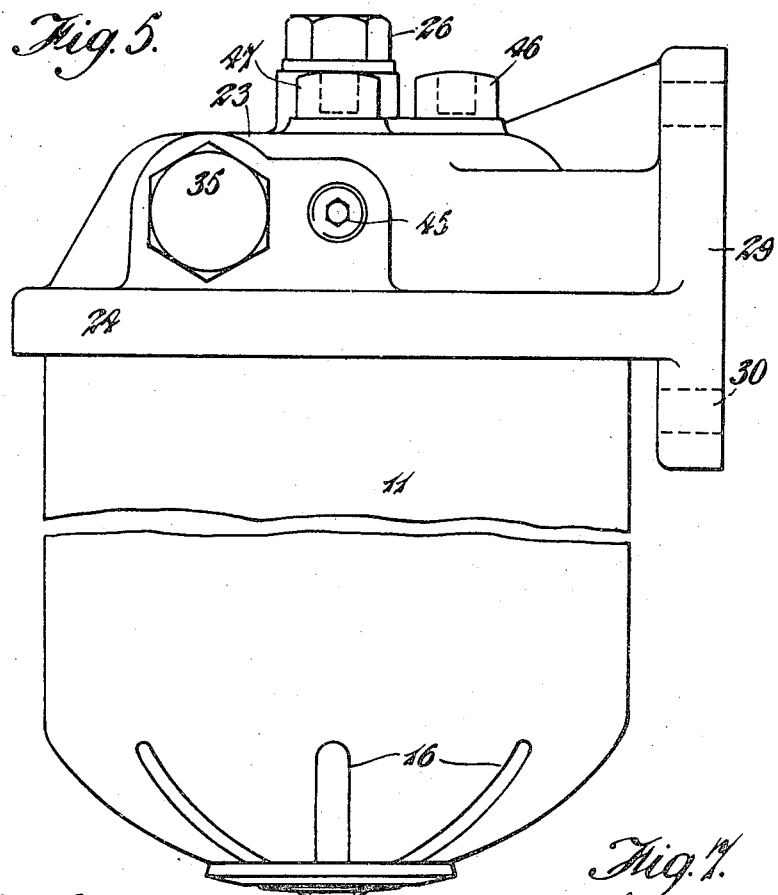
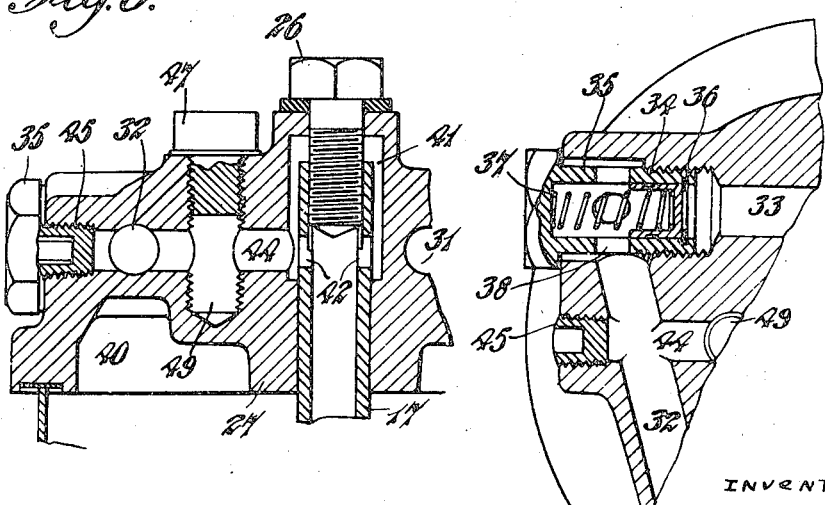
INVENTOR
Edward R. Robertson
By Watson, Cole, Grindle &
ATTORNEYS Watson

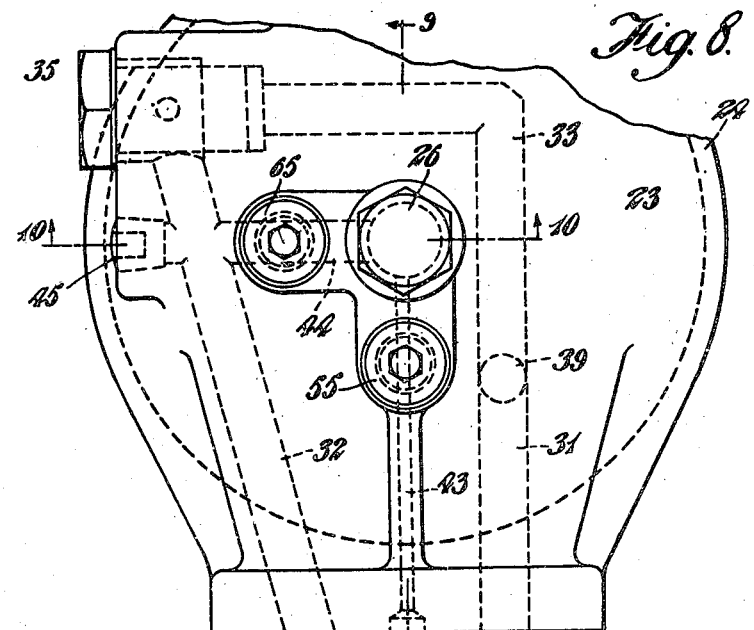
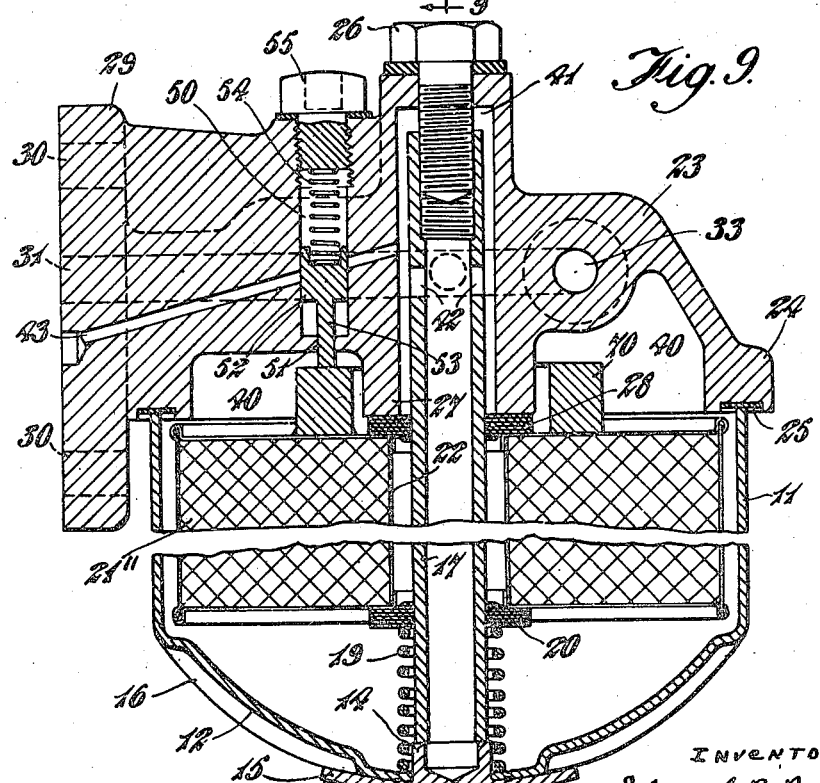

June 21, 1949. E. R. ROBERTSON 2,473,727
OIL FILTERING APPARATUS
Filed Feb. 18, 1944 5 Sheets-Sheet 5

INVENTOR
Edward R. Robertson
By Watson, Cole, Grindle & Watson
ATTORNEYS

Patented June 21, 1949

2,473,727

UNITED STATES PATENT OFFICE 2,473,727

OIL FILTERING APPARATUS

Edward Roker Robertson, St. Margarets-on-Thames, Twickenham, England, assignor, by mesne assignments, to Fram Corporation, East Providence, R. I., a corporation of Rhode Island Application February 18, 1944, Serial No. 522,930
In Great Britain May 4, 1943

12 Claims. (Cl. 210—183)

This invention relates to oil filtering apparatus and more particularly to filtering apparatus for incorporation in the lubricating system of internal combustion engines.

Two methods of filtering the oil in the lubricating system of internal combustion engines are in general use, namely the full-flow method of filtration and the by-pass method of filtration. In full-flow filtration all the oil circulated by the oil circulation pump is passed through a filter adapted to handle a large amount of oil and known as a full-flow filter, all the filtrate passing to the parts to be lubricated. To prevent the parts to be lubricated from being starved of oil in the event of the full-flow filter clogging up, a relief valve (usually called a by-pass valve) is generally included in the filter, said valve, when a predetermined pressure is exceeded on the inlet side of the filter, opening to allow oil to by-pass the filter and to pass directly to the bearings or other parts to be lubricated. In by-pass filtration part of the oil circulated by the oil circulation pump passes directly to the parts to be lubricated and the remainder of the oil, usually 5 to 10% of the total oil circulated, passes through a filter adapted to filter to a finer degree than a full-flow filter and known as a by-pass filter, the filtrate from the by-pass filter passing directly to the engine sump or other reservoir. Since the sump is at relatively low pressure, it is usually necessary to include, either on the inlet side or the outlet side of the by-pass filter, means, known as a restrictor, for preventing excessive flow of oil through the by-pass filter. Such a restrictor may conveniently be provided by a fitting having a suitably restricted passageway therethrough.

By-pass filters are becoming increasingly in favour for the filtration of engine oil, and are very satisfactory under normal engine operating conditions. However, in the case where new engines are being run in and in other cases where a relatively large amount of fine foreign particles are apt to be present in the oil in the engine sump, there is the danger that such particles may be carried over to the engine bearings or other working parts to a harmful extent, since with a by-pass filter, only a portion of the oil circulated by the oil circulation pump is forced through the filter.

The principal object of this invention is to provide filtering apparatus which is adapted for either full-flow or by-pass filtration and which can be readily changed from one type of filtration to the other.

A more specific object of the invention is to provide filtering apparatus wherein the insertion into filtering position of the appropriate filtering medium for either full-flow or by-pass filtration results in the means controlling the flow of oil being automatically brought to the positions required for the desired type of filtration.

A still further object of the invention is the provision of a filter unit which is adapted to be incorporated in the lubricating system of internal combustion engines and which may be used for either full-flow or by-pass filtration.

Figure 2:
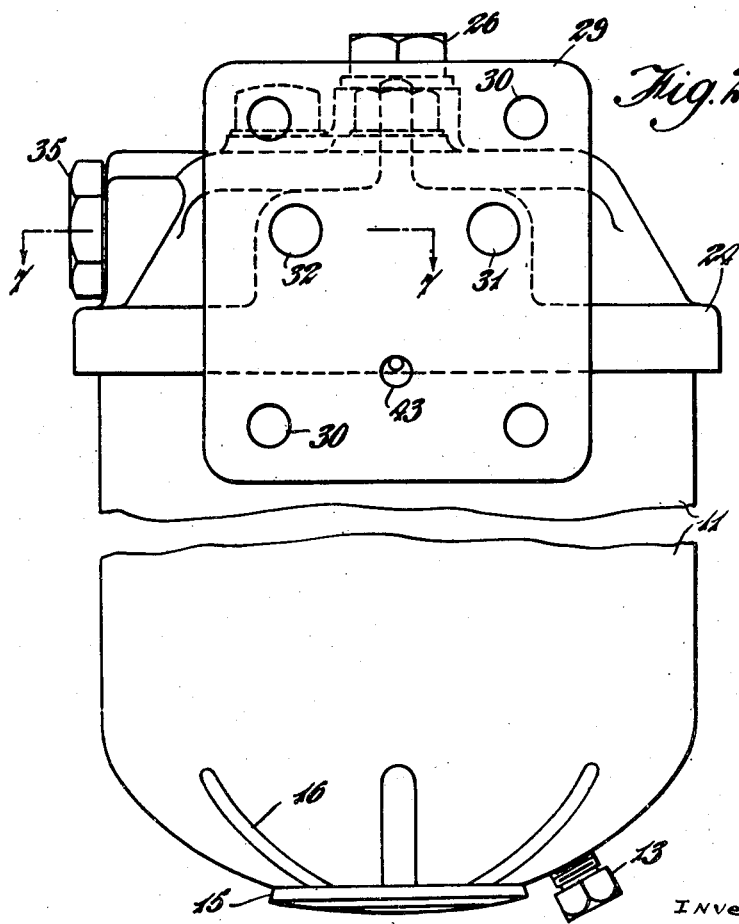
Figure 3:
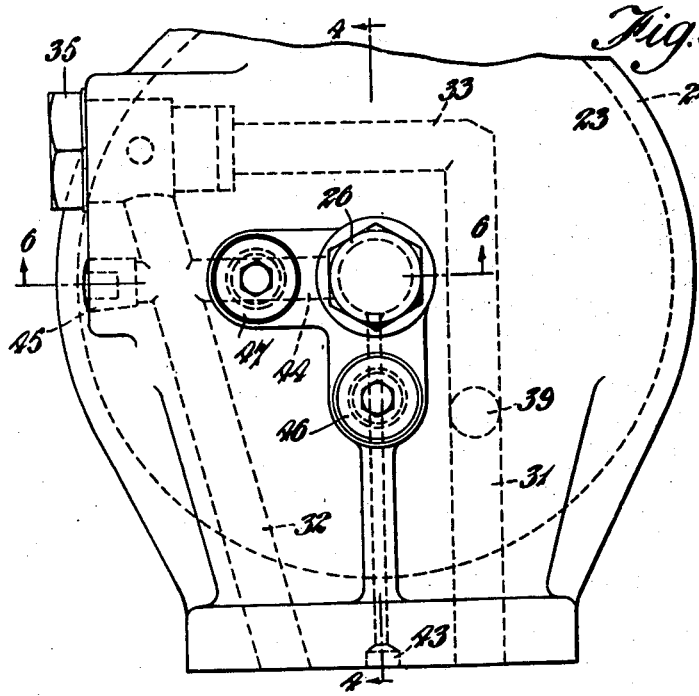
Figure 4:
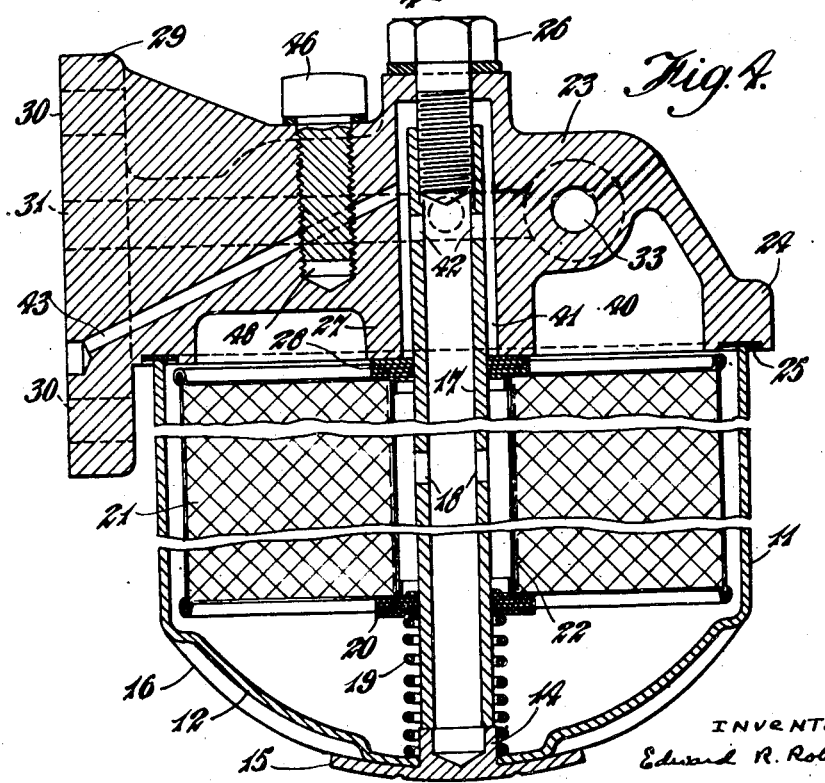
Figure 10:
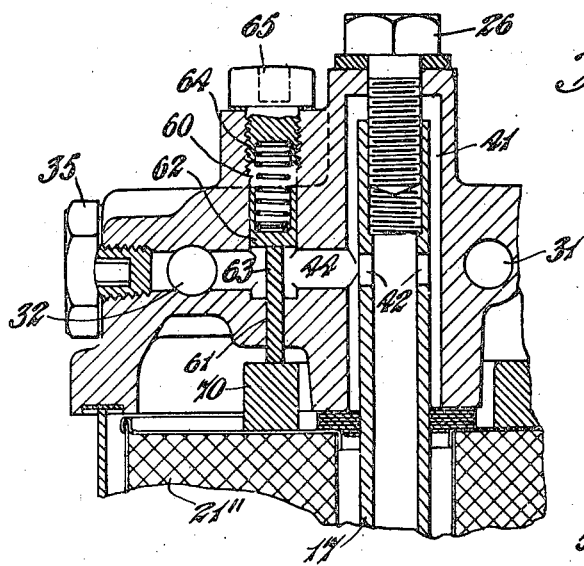
Figure 11:
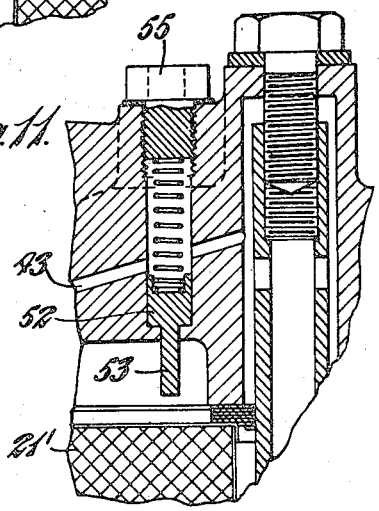
Figure 12:
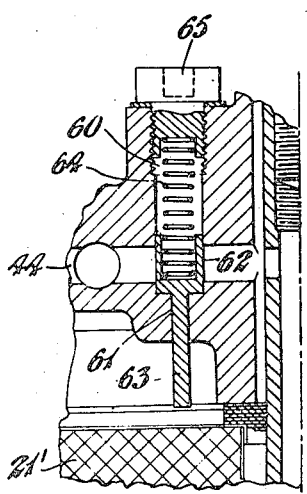

Other objects and advantages of the present invention will be apparent from the following description read in conjunction with the accompanying drawings, in which Fig. 1 shows diagrammatically one form of filtering apparatus in accordance with my invention;

Figs. 2 to 7 illustrate one form of filter unit in accordance with my invention, the filter being shown arranged for full-flow filtration, Fig. 2 being a side elevational view, Fig. 3 a top plan view, Fig. 4 a longitudinal section taken on the line 4—4 of Fig. 3, Fig. 5 an elevational view of the filter as seen from the left of Fig. 2, Fig. 6 a part sectional view taken on the line 6—6 of Fig. 3, and Fig. 7 a part sectional view taken on the line 7—7 of Fig. 2;

Figs. 8 to 12 illustrate one form of filter unit in accordance with my invention in which the valves are automatically set for the desired type of filtration, Fig. 8 being a top plan view, Fig. 9 a longitudinal sectional view taken on the line 9—9 of Fig. 8, showing a filter cartridge adapted for full-flow filtration, Fig. 10 a part sectional view taken on the line 10—10 of Fig. 8, and Figs. 11 and 12 being part sectional views, similar to those of Figs. 9 and 10 respectively, illustrating the position of the valves with a cartridge adapted for by-pass filtration.

Each of the various forms of oil filtering apparatus shown in the drawings comprises a main oil passageway having a valve, and a secondary oil circuit shunted across the valve, the secondary circuit including an oil filter means and a two-way valve or other means arranged on the outlet side of the filter means whereby oil may be passed from the filter means either back to the main oil passageway or to a separate by-pass outlet passageway.

Referring now to Fig. 1, which shows diagrammatically one form of apparatus suitable for use in the lubricating system of engines, the main oil passageway 1 forms part of the main oil circuit which leads from the engine sump 2 or other source of oil to the bearings 3 or other parts to be lubricated and which includes an oil circulation pump 4. A spring-loaded valve 5 is arranged in the main oil passageway 1 on the pressure side of the pump, the loading on the valve being such that, below a predetermined pressure in passageway 1 on the inlet side of the valve, the valve is closed and when the predetermined pressure is exceeded the valve opens against the action of its spring. The filter 6, which is preferably of the type comprising an outer casing and an inner filter cartridge, is included in a secondary circuit 7 shunted across the valve 5, and a two-way valve 8 is included in said circuit on the outlet side of the filter, so that oil from the filter may either pass back to the main oil passageway 1 and thence to the bearings 3, or through the separate by-pass outlet passageway 9 back to the sump 2.

If it be desired to operate the apparatus as a full-flow filter, the two-way valve 8 is actuated to place the outlet from the filter 6 in communication with the main oil passageway 1, as shown in the drawings, whereby the whole of the oil circulated by the pump 4 passes through the filter and thence to the bearings, the spring-loaded valve 5 opening should undue pressure develop in the shunt circuit 7 so that the filter is by-passed. When it be desired to change to by-pass filtration, the cartridge in the filter is changed for one adapted to filter to a finer degree and the two-way valve 8 is actuated to place the outlet from the filter 6 into communication with the by-pass outlet passageway 9. Due to the high resistance to oil flow offered by the by-pass cartridge, the spring-loaded valve 5, in operation of the engine, is held open against its spring so that most of the oil circulated by the pump 4 passes directly to the engine bearings 3 and only a fraction of the oil passes through the filter 6 directly back to the engine sump.

A restrictor, indicated by the reference numeral 10, is advantageously included in the by-pass outlet passageway 9 so that should, through inadvertence, a full-flow (low resistance) cartridge be inserted in the filter when the two-way valve 8 is set for by-pass operation, excessive flow of oil through the by-pass outlet passageway will be prevented. It will be understood that, should a by-pass (high resistance) cartridge be inadvertently inserted in the filter when the two-way valve is set for full-flow operation, the valve 5 in the main oil passageway will open to allow oil to pass directly to the bearings.

The main oil passageway valve and the two-way valve or other means whereby oil from the filter may be passed either back to the main oil circuit or to the by-pass outlet passageway may be combined with the filter to form a unit, and one form of such a unit is shown in Figs. 2 to 7 of the drawings.

Referring now to Figs. 2 to 7, the filter unit therein shown comprises a generally cylindrical container 11 having an integral domed bottom wall 12 provided with a draining plug 13 and a centrally disposed aperture through which extends the boss 14 of a closure cap 15 welded to wall 12 which is provided with strengthening flutes 16. A tube 17 having apertures 18 therein extends centrally through the container 11 and has its lower end welded or brazed to boss 14 and its upper end extending beyond the open upper end of the container. Supported by spring 19 surrounding boss 14 and the lower part of tube 17 is an annular packing member or washer 20 on which seats a cylindrical filter cartridge 21. The cartridge is co-axially arranged within container 11 and has a diameter somewhat less than the internal diameter of container 11 and also has a centrally disposed longitudinally extending tube 22 having a greater diameter than the external diameter of tube 17.

The top of the container 11 is closed by a cover member 23 in the form of a dome-shaped casting having a rim 24, the inner face of which is formed with an annular recess housing a packing member 25. The upper end of container 11 is urged tightly against packing member 25 to form a liquid-tight assembly by bolt 26 screwed into the upper end of tube 17 which extends through a co-axial bore in the cover member, the said bore having a diameter greater than the external diameter of tube 17, thereby forming an annular space 41 surrounding tube 17. An annular packing member 28 surrounding tube 17 is interposed between an annular boss 27 on the top cover member 23 and the top of cartridge 21, and the spring 19 urges packing members 20 and 28 against their seating surfaces so as to prevent passage of oil from the space outside cartridge 21 directly to the spaces surrounding tube 17. Integral with top cover member 23 is a flange 29 having bolt-receiving apertures 30 whereby the filter may be secured to the desired support.

Extending transversely through flange 29 and cover member 23 is an oil inlet passageway 31 and a full-flow outlet passageway 32, and passageways 31 and 32 are connected by a third passageway 33 which, below a predetermined pressure of oil in passageway 33, is closed by plunger valve 34 movable within valve chamber 35 screwed into the enlarged outer end of passageway 33. The plunger 34, which is open at its inner end, is urged by spring 37 against a stop provided by the split spring ring 36 and it will be understood that, when the oil pressure in passageway 33 exceeds the predetermined value, the plunger is forced to the left against the action of the spring to allow oil to flow from passageway 33 through a hole 38 in valve chamber 35 into the full-flow outlet passageway 32. Passageways 31, 32, 33 form, in effect, a single valve-controlled main oil passageway.

A longitudinally extending passageway 39 (see Fig. 3) connects inlet passageway 31 with space 40 beneath the top cover member 23 and oil entering passageway 31 passes down through passageway 39 into the space surrounding cartridge 21, whence it flows through cartridge 21 and into tube 17 through holes 18. The oil flows upwardly through tube 17 into the annular space 41 through holes 42 in the upper part of tube 17.

Communicating with space 41 are a by-pass outlet passageway 43 which extends obliquely through flange 29 and cover member 23, and a transverse passageway 44, which intersects and communicates with the full-flow outlet passageway 32, the outer end of passageway 44 being closed by screw plug 45. Flow of oil from space 41 through the passageways 43 and 44 is controlled by interchangeable screw plugs 46 and 47 receivable in longitudinally extending sockets 48 and 49 which intersect passageways 43 and 44 respectively. The plugs 46 and 47 are of such length that, when arranged as shown in the drawings (see Figs. 4 and 6), the passageway 43 is closed and the passageway 44 is open and that, when the plugs are substituted one for the other, passageway 43 is open and passageway 44 is closed. Passageway 39, space 41 and passageway 44 form a secondary oil circuit which includes filter cartridge 21 and which is shunted across valve 34 in the main oil passageway, these parts corresponding respectively to the secondary oil circuit 7 which includes the filter 6 and which is shunted across valve 5 in the main oil passageway 1 in Figure 1.

The operation of the filter is as follows. Assuming that it is desired to operate the filter as a full-flow filter, a cartridge adapted for full-flow filtration is inserted into container 11 and the plugs 46 and 47 (which correspond to valve 8 in Figure 1) are inserted into sockets 48 and 49 respectively, as shown in Figs. 4 and 6. With this arrangement of the plugs, the by-pass outlet passageway 43 (which corresponds to passageway 9 in Figure 1) is closed and, with plunger 34 in its closed position, all the oil forced into inlet passageway 31 passes through the filter cartridge and through the full-flow filter outlet passageway 44 to the full-flow outlet passageway 32. It will be understood that, in the event of excessive pressure building up on the inlet side of the cartridge, the plunger 34 moves to its open position, thus allowing oil to pass directly from inlet passageway 31 to the full-flow outlet passageway 32 and thence to the bearings or other parts to be lubricated.

When it is desired to change to by-pass filtration, the cartridge is changed for one adapted for by-pass filtration and the plugs 46 and 47 are interchanged. With these positions of the plugs, oil flowing through the cartridge and into space 41 passes to the by-pass outlet passageway 43, and the passageway 44 is closed. The pressure required to force oil through the by-pass cartridge is such, however, that plunger 34 is forced to its open position, thus allowing part of the oil pumped into passageway 31 to flow directly to the full-flow outlet passageway 32 via passageway 33. A restrictor (not shown) (corresponding to the resistor 10 in Figure 1) is preferably included in the by-pass outlet passageway 43, or in the pipe connecting such passageway to the engine sump, to prevent excessive flow of oil through the filter cartridge.

It will be seen from the above description of the filter shown in Figs. 2 to 7 that I have provided a compact filter which is adapted to be incorporated in the lubricating system of internal combustion engines and which is readily changeable from full-flow filtration to by-pass filtration, and vice versa. From the description of the apparatus shown in Fig. 1, it will be understood that, should the plugs 46 and 47 be incorrectly positioned for the type of cartridge housed within the container 11, oil will still flow through the full-flow outlet passageway 32 and the bearings will not be starved of oil.

In accordance with an important feature of my invention a valve or valves controlling flow of oil from the filter means to the by-pass and full-flow outlet passageways is or are automatically brought to the position required for the desired type of filtration. For example, flow of filtrate to the full-flow and by-pass outlet passageways may be controlled by suitably-positioned spring-loaded valves such that, on insertion of a full-flow cartridge into operative position in the filter unit, means on the cartridge actuate the said valves against their spring pressure to close the by-pass outlet passageway and open the passageway permitting filtrate to flow to the full-flow outlet passageway, the said valves, when the full-flow cartridge is withdrawn, moving under the action of their springs to positions such that the by-pass outlet passageway is open and flow of filtrate to the full-flow outlet is prevented, and the said valves remaining in such position on insertion of a cartridge adapted for by-pass filtration. A filter unit operating in this manner is illustrated in Figs. 8 to 12 of the drawing. The filter unit shown in these figures is, in its general construction, similar to the filter unit illustrated in Figs. 2 to 7, and in Figs. 8 to 12 like reference numerals are used to denote like parts.

Referring now to Figs. 8 to 12, the cover member 23 has longitudinally extending bores 50, 60, which intersect passageways 43 and 44 respectively and which terminate respectively in narrow bores 51, 61, communicating with the space 40 beneath cover member 23. Mounted within bores 50, 60 are plunger valves 52, 62 having stems 53, 63 which extend into and beyond narrow bores 51, 61 respectively. The plungers 52, 62 are urged downwardly by springs 54, 64 interposed between the plungers and screw closure plugs 55, 65 respectively. The length of bores 50 and 60 is such that, when the plungers are in their lowermost position, plunger 52 is below the by-pass outlet passageway 43, which is thereby open to the flow of filtrate, and plunger 62 closes the passageway 44, as seen in Figs. 11 and 12, which show the position of the plungers for by-pass filtration, 21' indicating a cartridge adapted for by-pass filtration.

The cartridge adapted for full-flow filtration is provided with means which, when the cartridge is in operative position, engage the projecting ends of the plunger stems 53, 63 and lift the stems and plungers to such positions that the plunger 52 closes the by-pass outlet passageway 43 and the plunger 62 opens the full-flow filter outlet passageway 44. Thus, the full-flow cartridge, which is indicated by the reference numeral 21", may have an annular boss 70 secured to the top of the cartridge, the said boss serving to lift the plungers 52, 62 to the positions required for full-flow filtration, as shown in Figs. 9 and 10. It will be understood that, when the full-flow cartridge 21" is removed from container 11, the plungers 52, 62, under the action of springs 54, 64, automatically move to the positions shown in Figs. 11 and 12, i. e. the positions required for by-pass filtration and that the plungers remain in such position until such time as they are automatically moved to the position for full-flow filtration by the insertion of a full-flow cartridge such as 21".

I claim:

1. Oil filtering apparatus adapted to be used for full-flow or by-pass filtration, said apparatus comprising an oil inlet, a first oil outlet delivering oil to a part to be lubricated, a passageway communicating with the oil inlet and with the oil outlet, a spring loaded valve operative in response to a predetermined pressure for controlling flow of oil through said passageway, a filtering circuit connected in shunt across the valve, filter means in said filtering circuit, an oil reservoir, means for returning oil from said reservoir to said oil inlet, a second oil outlet delivering oil to said reservoir, a second passageway communicating directly with the said filtering circuit on the outlet side of the filter means and also communicating with the second oil outlet, and means controlling the flow of oil from the filter means to the first and second passageways whereby the whole of such oil may be passed either to the first outlet or to the second outlet.

2. A full-flow oil filter unit comprising a casing, filter means housed within the casing, an oil inlet communicating with said filter means, a first oil outlet delivering oil to a part to be lubricated, means for receiving oil to be filtered through said inlet and through the filter means to the outlet, a passageway connected in shunt across the filter means, a relief valve in said passageway, which permits the filter means to be by-passed when excessive pressure builds up across the filter means, a second outlet from the filter means, and means for diverting the total flow of filtrate from the first outlet to the second outlet.

3. An oil filter unit comprising a casing, filter means housed within the casing, an oil inlet communicating with said filter means, a first oil outlet delivering oil to a part to be lubricated, means for passing oil to be filtered through said inlet and through the filter means to the outlet, said means including a passageway on the outlet side of the filter means and a first outlet valve controlling flow of filtrate through said passageway, a passageway shunted across the filter means, a relief valve in said second mentioned passageway that is adapted to be opened to allow oil entering the filter unit to pass directly to the outlet when the pressure across the filter means becomes excessive, a second outlet, a passageway connecting the second outlet with the outlet side of the filter means, and a second outlet valve controlling flow of filtrate through said third mentioned passageway, whereby said outlet valves may be selectively opened to effect operation of the filter unit alternately as a full-flow and by-pass filter.

4. A unit according to claim 3, wherein the filter means and the outlet valves are provided with cooperating control means comprising plugs of different length operable on insertion of said filter means in said casing to open one only of said valves and thereby to effect selection of full-flow or by-pass operation.

5. A unit according to claim 3, wherein the outlet valves controlling the first and third mentioned passageways comprise plugs of different lengths housed in bores, one of which intersects one of said passageways, the said plugs being interchangeable and adapted one to close the first passageway and leave open the third passageway and the other to close the third passageway and leave open the first passageway.

6. A unit according to claim 3, wherein the outlet valves controlling the first and third mentioned passageways are mounted in said casing and comprise spring urged plungers having projecting means positioned to extend across passageways and through a portion of the casing into a filtering chamber for engagement by the filter means on insertion of the latter in said casing, whereby the plungers are held against their springs in operative position for full flow filtration, the plungers, when the filtering means is withdrawn from the casing, being adapted to move under the action of their springs into operative position for by pass filtration.

7. An oil filter adapted for selective operation as a full-flow or a by-pass filter, comprising a casing, filter means housed within said casing, means for receiving oil to be filtered and delivering it to the filter, a first oil outlet delivering oil to a part to be lubricated, a passageway for by-passing said filter means, a spring-controlled valve therein adapted to be opened when the pressure becomes excessive, valve control means adapted when in one position to pass all the oil passed into the casing through the filter means to the outlet, a second outlet, said valve control means adapted when in a different position to pass part of the oil passed into the casing partly through the filter means to the second outlet and the remainder of the oil separately and directly through the by-pass passageway to the first outlet.

8. In a full-flow oil filter unit of the type comprising a casing, filter means housed within the casing, means for receiving oil to be filtered and delivering it to the filter, said casing having a first oil outlet delivering oil to a part to be lubricated, means for passing oil to be filtered through the filter means to the outlet, a passageway shunted across the filter means and a valve in said passageway which is normally shut but is adapted to open when pressure across the filter means exceeds a certain value, said casing having a second outlet, a passageway placing the second outlet in communication with the outlet side of the filter means, and means for controlling the flow of filtrate such that the whole of the filtrate may be passed alternately to the first and second outlets.

9. An oil filter unit comprising a casing, filter means housed within said casing, a closure member for said casing having an oil inlet for connection to a source of supply of oil, a first oil outlet delivering oil to a part to be lubricated, a second outlet for returning oil to said source of supply, a passageway in said closure member connecting said inlet and the first outlet, a relief valve in said passageway adapted to open when the pressure on the inlet side thereof exceeds a predetermined value, means placing the passageway on the inlet side of the valve therein in communication with the inlet side of the filter means, a second passageway placing the first passageway on the outlet side of the valve therein in communication with the outlet side of the filter means, a third passageway placing the second outlet in communication with the outlet side of the filter means, and selectively operable control valves in the second and third passageways controlling the flow of filtrate therethrough whereby the filter unit may be used alternately for full-flow and by-pass filtration.

10. An oil filter unit according to claim 9, wherein the said control valves are in the form of interchangeable plugs, one of which is adapted to close the second passageway and open the third passageway and the other of which is adapted to open the second passageway and to close the third passageway.

11. An oil filter unit comprising a casing, said casing being constructed to receive and house a removable filter cartridge a first oil outlet on the unit delivering oil to a part to be lubricated, means for passing oil to be filtered through the filter cartridge to the outlet, a pressure release circuit connected in shunt across the filter cartridge permitting oil to be filtered to pass directly to the outlet when the pressure required to force oil through the filter cartridge exceeds a certain value, a source of supply of oil for said unit, a second outlet on the unit for connection to said supply source, means placing the outlet side of the filter cartridge in communication with the second outlet, spring-urged valve means controlling the flow of filtrate to the first and second outlets, said valve means being adapted to be moved against its spring action to a position in which filtrate may flow to the first outlet and not to the second outlet and to be moved under its spring action to a position in which filtrate may flow to the second outlet and not to the first outlet, said valve means being positioned for engagement by said cartridge to hold said valve means in the first mentioned position.

12. An oil filter unit comprising a casing, a filter cartridge in said casing, a first oil outlet delivering oil for to a part to be lubricated, means for passing oil to be filtered through the cartridge to the outlet, a passageway connected in shunt across the cartridge, a valve in said passageway which is normally shut but which is adapted to open when the pressure required to force oil through the cartridge exceeds a predetermined value, a second outlet, a second passageway placing the second outlet in communication with the outlet side of the cartridge, valve means controlling flow of filtrate from the cartridge and adapted, in one position, to allow filtrate to flow only to the first outlet and, in another position, to allow filtrate to flow only to the second outlet, and means on the cartridge engaging the valve means to hold them in a selected one of such positions.

EDWARD ROKER ROBERTSON.

REFERENCES CITED

The following references are of record in the file of this patent:

UNITED STATES PATENTS

| Number | Name | Date |
|---|---|---|
| 1,379,259 | Hans | May 24, 1921 |
| 1,592,835 | Mock et al. | July 20, 1926 |
| 1,709,472 | Hammer | Apr. 16, 1929 |
| 1,913,402 | Liddell | June 13, 1933 |

FOREIGN PATENTS

| Number | Country | Date |
|---|---|---|
| 24,780 | Great Britain | 1908 |
| 344,768 | Great Britain | 1931 |